R. N. GEFFROY.
COOKING UTENSIL.
APPLICATION FILED OCT. 10, 1912.
1,115,303.
Patented Oct. 27, 1914.
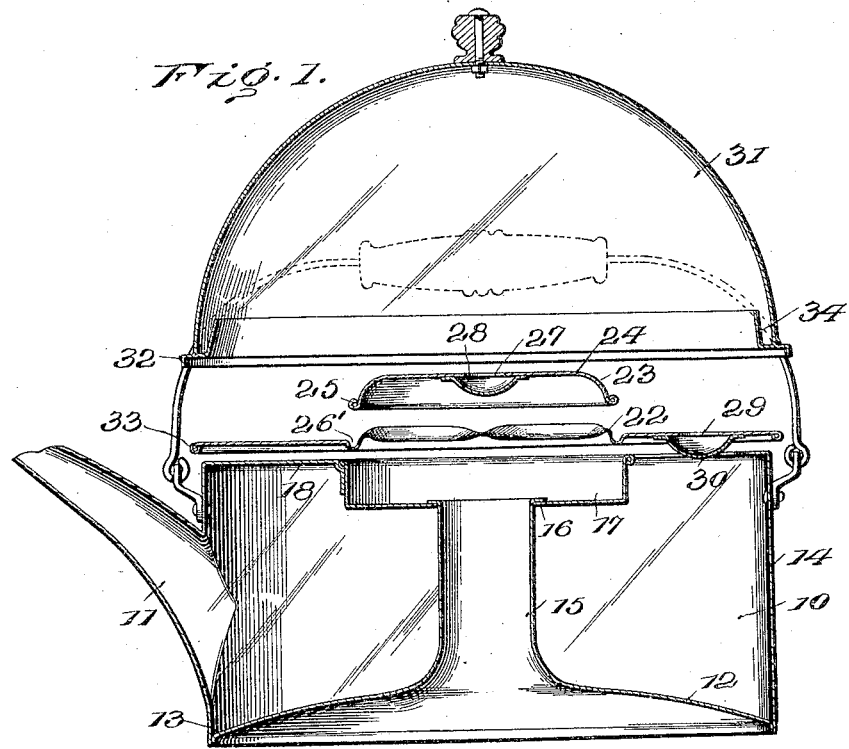
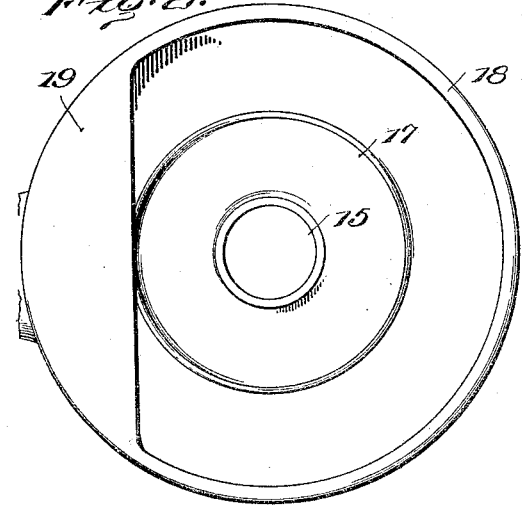
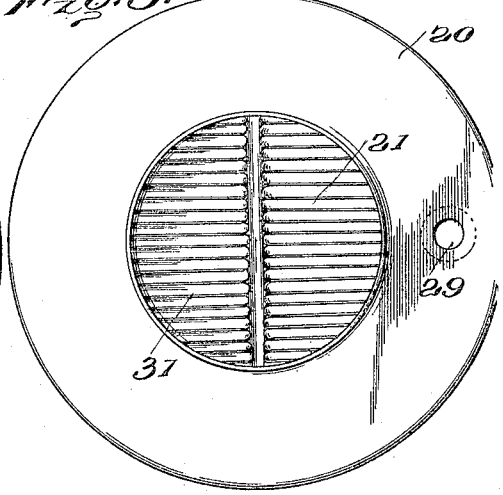
WITNESSES
INVENTOR
R. N. Geffroy.
By
Attorneys.

UNITED STATES PATENT OFFICE.

RALPH N. GEFFROY, OF STOCKTON, CALIFORNIA.

COOKING UTENSIL.

1,115,303.  Specification of Letters Patent.  Patented Oct. 27, 1914.

Application filed October 10, 1912. Serial No. 725,085.

*To all whom it may concern:*

Be it known that I, RALPH N. GEFFROY, citizen of the United States, residing at Stockton, in the county of San Joaquin and State of California, have invented certain new and useful Improvements in Cooking Utensils, of which the following is a specification.

This invention relates to an improvement in cooking utensils.

The primary object of the invention is to provide a water heating receptacle with means for cooking food, the food receptacle being disposed above the water heating compartment and in direct communication with the heat supply.

A further object of the invention is to provide a device of this character in which the food to be cooked may be either steamed or placed on a member which is directly subjected to the heat.

A still further object of the invention is to provide means which when the utensil is used as a steamer will retain the condensation of the steam and prevent the same from returning to the water container.

A still further object of the invention is to provide a construction in which the heat will be directed from the entire under-surface of the receptacle to a central flue.

In the drawings: Figure 1 is a vertical section, the covers and steam dome being removed from the receptacle; Fig. 2 is a plan view of the receptacle, the covers being removed; and Fig. 3 is a plan view of one of the cover members which serves as a grate.

In the drawings, 10 designates a water receptacle which is provided with a spout 11. The base 12 of the receptacle is concave, its edge portion 13 either being formed integral with or secured to the side-walls 14 of the receptacle. The base is provided at its center with a vertically disposed flue 15. The upper portion of said flue is provided with a beading 16 which extends within a tray 17. The receptacle 10 is provided at its upper edge with a flange 18 preferably formed integral with the same, which is more extensive at the side of the receptacle adjacent the spout 11, the portion 19 of said flange extending across the receptacle. The receptacle is filled with water through the opening between the tray 17 and the flange 18, the tray being supported at its edge by the portion 19 of said flange.

When it is desired to broil the food, or place the receptacle in which the food is contained directly above the heat flue, the plate 20 is placed upon the flange 18. This plate is provided at its center with a grill 21, which is raised with respect to the plate, the grill being formed by cutting the plate and bending the ribs 22 formed by the series of cuts in the plate transversely to the divided portion of the plate. By this construction, it will be noted that when the receptacle 10 is placed over a gas flame that the heat will arise through the flue 15, the concave bottom 12 directing the heat upwardly through the flue, and the food which is either placed directly on the grill 21 or in a receptacle disposed on said grill will be thoroughly cooked.

When it is desired to use the receptacle as a steamer, the plate 20 with which the grill 21 is formed integral is removed and the small cover 23 is placed down on the tray 17, the cover 23 thus extends over the flue 15. The food container is then placed on top of the tray and the hood 31 placed in position, the device thus providing an efficient steamer or warmer. The closure 23 consists of a plate 24 formed with flanges 25 which are rolled and capable of being inserted within a groove 26' formed in the plate 20, it being understood, however, that when the device is used as a steamer the closure does not rest upon the plate 20 but upon the tray 17, the plate 20 having been removed. The closure 23 is formed with a central opening 27 which forms a means of removing the same, a cover plate 28 being disposed beneath said opening. The plate is formed with an opening 29 beneath which the curved plate 30 is supported, thus providing means for lifting the plate 20 when the device is used as a steamer. With the closure 23 in position, the hood 31 is placed upon the receptacle, the hood being formed with a downwardly extending flange 32 which embraces the upper edge of the receptacle 10, clamping the rolled edge 33 of the plate 20 to the receptacle 10. The steam dome or hood 31 is formed with the interiorly disposed flange 34 which receives the condensation and prevents the water, which has absorbed the odors arising from the food, from returning to the receptacle 10. When the steam dome is thus placed upon the receptacle, it will be noted that the device forms an efficient steamer.

The many advantages of a construction of this character will be clearly apparent, as it will be noted that it may be used for various purposes, being readily interchanged from a cooker of the usual type to a steam-cooker, the device at all times being used as a water heating vessel. It will be also noted that the entire construction is such that it may be easily and economically manufactured, and that the various parts may be readily assembled.

Having thus described my invention, what I claim and desire to secure by Letters Patent is:—

1. A cooking utensil comprising a receptacle, said receptacle being formed with a concave base, a flue supported by said base, a tray supported by said flue, a flange at the upper edge of said receptacle, said flange being more extensive adjacent one side of the receptacle and forming a support for the tray, a plate disposed to rest upon said flange, said plate being formed with a grill, a closure for said grill, and a steam dome, said dome being formed with a flange disposed to embrace the edge of the receptacle and maintain said plate in contact therewith, said dome being formed interiorly with a flange, the condensation being received by the space between said flange and the dome.

2. A cooking utensil comprising a receptacle, said receptacle being formed with a concaved base, a flue extending vertically within the receptacle and forming a continuation of the base, a tray formed with an opening through which the flue projects, the receptacle being provided with a flange surrounding said tray and secured thereto, a plate, the edge portion of which rests upon the flange of the receptacle, and the central portion of which constitutes a grill which rests upon the tray, and a dome disposed to embrace the edges of the plate and the receptacle.

3. A cooking utensil comprising a receptacle formed with a flue, a tray supported by said flue and disposed within the receptacle, the edges of said tray being connected to the edges of the receptacle, a plate arranged upon the upper edge of the receptacle, said plate being formed with a grill disposed above the tray, and a closure for the receptacle disposed to embrace the edge of said plate and hold the same in contact with the receptacle.

In testimony whereof I affix my signature in presence of two witnesses.

RALPH N. GEFFROY. [L. S.]

Witnesses:
W. W. HUBBARD,
SUSIE H. HUBBARD.

---

Copies of this patent may be obtained for five cents each, by addressing the "Commissioner of Patents, Washington, D. C."